(12) United States Patent
Christie

(10) Patent No.: US 11,491,906 B2
(45) Date of Patent: Nov. 8, 2022

(54) TIE DOWN RATCHET AND STRAP

(71) Applicant: Friend Success Inc., Corinth, TX (US)

(72) Inventor: Jeffrey Christie, Garland, TX (US)

(73) Assignee: FRIEND SUCCESS INC., Corinth, TX (US)

( * ) Notice: Subject to any disclaimer, the term of this patent is extended or adjusted under 35 U.S.C. 154(b) by 938 days.

(21) Appl. No.: 16/034,893

(22) Filed: Jul. 13, 2018

(65) Prior Publication Data

US 2020/0017016 A1    Jan. 16, 2020

(51) Int. Cl.
*B60P 7/08* (2006.01)
*D04C 1/06* (2006.01)
*D07B 5/04* (2006.01)

(52) U.S. Cl.
CPC ............... *B60P 7/083* (2013.01); *D04C 1/06* (2013.01); *D07B 5/04* (2013.01); *D07B 2201/209* (2013.01); *D07B 2201/2092* (2013.01); *D07B 2205/201* (2013.01); *D07B 2205/2039* (2013.01); *D07B 2205/2046* (2013.01); *D07B 2205/306* (2013.01); *D07B 2205/3028* (2013.01); *D07B 2205/3067* (2013.01); *D07B 2401/202* (2013.01); *D07B 2401/2075* (2013.01); *D10B 2101/20* (2013.01)

(58) Field of Classification Search
CPC ....... B60P 7/083; B60P 7/0823; B60P 7/0846; B60P 7/0861; B60P 7/0838; B60P 7/0853; B60P 7/08; B60P 3/079
USPC ....... 410/100, 103, 97, 98, 101, 23, 118, 12, 410/116, 155, 20, 96, 9; 24/68 cd, 909, 24/68 d, 68 r, 69 st; 254/218, 223, 247, 254/108, 266, 238, 237
See application file for complete search history.

(56) References Cited

U.S. PATENT DOCUMENTS

| | | | | |
|---|---|---|---|---|
| 4,191,344 A | * | 3/1980 | Tillac | B60R 22/1951 242/374 |
| 6,510,717 B1 | * | 1/2003 | Levi | E05B 67/003 70/14 |
| 9,909,535 B2 | * | 3/2018 | Sirosh | F02M 21/0221 |
| 2005/0166943 A1 | * | 8/2005 | Owens | A47L 13/16 134/6 |
| 2010/0322737 A1 | * | 12/2010 | Huang | B60P 7/083 410/100 |
| 2014/0013544 A1 | * | 1/2014 | Moreau | A45F 5/00 24/3.12 |
| 2015/0291079 A1 | * | 10/2015 | Wright | B60P 3/079 410/100 |
| 2016/0250961 A1 | * | 9/2016 | Tolly | B64D 25/06 410/100 |

* cited by examiner

*Primary Examiner* — D Glenn Dayoan
*Assistant Examiner* — Sunsurraye Westbrook
(74) *Attorney, Agent, or Firm* — Gregory M. Howison

(57) ABSTRACT

A tie down ratchet and strap includes, a ratchet shaft rotatably mounted in a ratchet body having a slot for receiving a wind-up strap therethough, a pair of ratchet wheels mounted on the ratchet shaft, a ratchet handle with a pawl engaging the ratchet wheels to rotate the ratchet shaft, a locking bar securing the ratchet wheels and ratchet shaft in position when the pawl is disengaged from the ratchet wheels, an anchor strap with a connector for securing the ratchet assembly to a first anchor point, and a wind-up strap including a non-metallic fabric strap with a braided metal outer cover extending continuously over the length of the non-metallic fabric strap.

13 Claims, 4 Drawing Sheets

TIE DOWN RATCHET AND STRAP

TECHNICAL FIELD

The disclosure relates to tie-down devices, more specifically to tie down ratchets and straps typically used to secure cargo during transport.

BACKGROUND

Tie down ratchets are widely used in a variety of applications to secure cargo for transport. Typical applications include securing cargo in rail cars, flatbed trailers, truck beds and automobile carry racks. Ratchet type tie down straps enable the user to tension the straps across cargo and can easily be tightened to re-tension the straps in the event that the straps loosen during transport without unknotting or unfastening and retightening or resecuring ropes, chains or other types of tie downs. Tie down ratchets typically use polyester fabric straps due to the strength and durability of the straps. Polyester straps are however, still subject to fraying and failure due to mechanical abrasion. Further, while polyester strapping generally has greater resistance to UV degradation than polypropylene or nylon, polyester straps are subject to UV degradation.

SUMMARY

A tie down ratchet and strap includes a ratchet assembly having a body with first and second ends and a slotted ratchet shaft rotatably mounted in the body at the first end of the body. A pair of toothed ratchet wheels is mounted on the ratchet shaft adjacent opposing ends thereof and the shaft is slotted to receive a wind-up strap therethough. A ratchet handle is rotatably mounted on handle with a spring loaded pawl for engaging the teeth of the ratchet wheels and rotating the ratchet shaft. A spring loaded locking bar engages and holds the ratchet wheel and shaft when the pawl is disengaged to reset the handle for another wind of the ratchet shaft. An anchor strap affixed to the ratchet body at the second end includes a first connector such as a hook, D-ring, carabiner or spring link for securing the ratchet assembly to a first anchor point. A wind-up strap configured to pass through the slot in the ratchet shaft includes a non-metallic fabric strap enclosed in a braided metal outer cover that extends over the length of the fabric strap. The metal cover is braided from wires formed from stainless steel, aluminum, copper, or similar suitable metals and alloys and formed in a generally rectangular configuration with top, bottom and side wall that enclose the fabric strap. The wires are relatively small, having a diameter of less than about 1 mm, for example from about 0.1 to about 0.5 mm.

The wind-up strap may include a second connector such as a hook, D-ring, carabiner or spring link for securing the ratchet assembly to a second anchor point. The anchor strap and the fabric strap may be formed from polypropylene, polyethylene, polyester or similar appropriate materials. In most applications, the anchor and fabric straps will be formed from polyester due to the strength and stretch resistance of the material.

BRIEF DESCRIPTION OF THE DRAWINGS

For a more complete understanding, reference is now made to the following description taken in conjunction with the accompanying Drawings in which.

DETAILED DESCRIPTION

Figure 1:
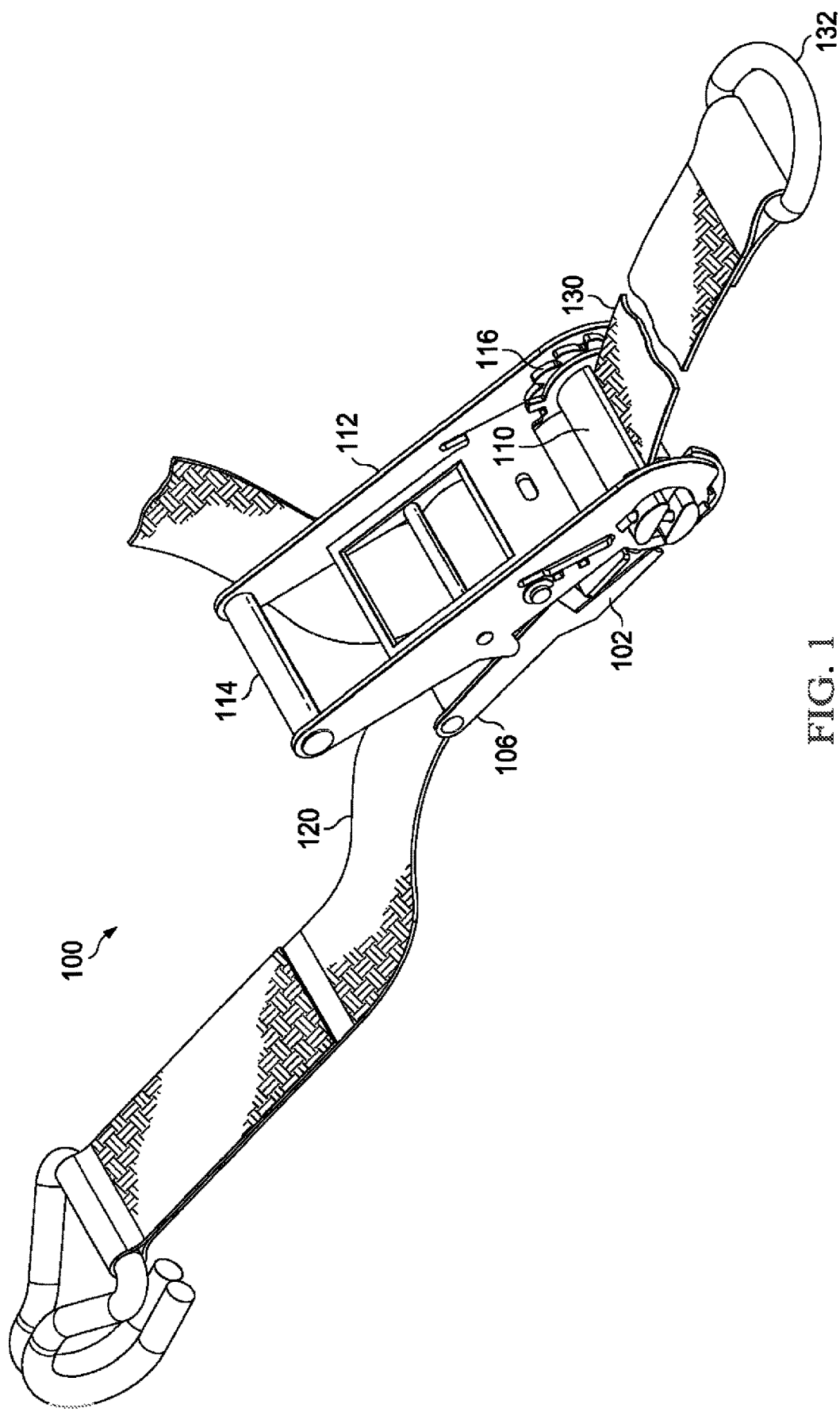
FIG. 1 is a partial perspective view of a tie down ratchet and strap including a ratchet assembly.

Referring now to the drawings, wherein like reference numbers are used herein to designate like elements throughout, the various views and embodiments of tie down ratchet and strap are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 is a partial perspective view of a tie down ratchet and strap including a ratchet assembly 100 having a ratchet body 102 with first and second ends 104 and 106. A pair of ratchet wheels 116 are mounted on ratchet shaft 110 that is transversely and rotatably mounted in ratchet body 102 adjacent a first end 104 of the ratchet body. Ratchet shaft 110 is turned with ratchet handle 114 and a spring-loaded pawl 118 mounted on the handle. An anchor strap 120 is affixed to ratchet body 102 near second end 106 of the ratchet body. Anchor strap 120 may be provided with a hook 124, D-ring, O-ring or other suitable connector for connecting the anchor strap to an anchor point. Anchor strap 120 may be made of any suitable material, for example a polyester fiber strap. Anchor strap 120 typically has a fixed length and is selected to have sufficient tensile strength, for example from 500 to 10,000 pounds, depending upon the application, to secure cargo in place during transit, for example an appliance such as a refrigerator or range in the bed of a pickup truck or pipe on a flatbed trailer. Alternatively, a chain, cable, rope or similar connector may be used as an anchor strap. Anchor strap 120 provides a first connection point for connecting assembly 100 to an anchor point in use.

Figure 2:
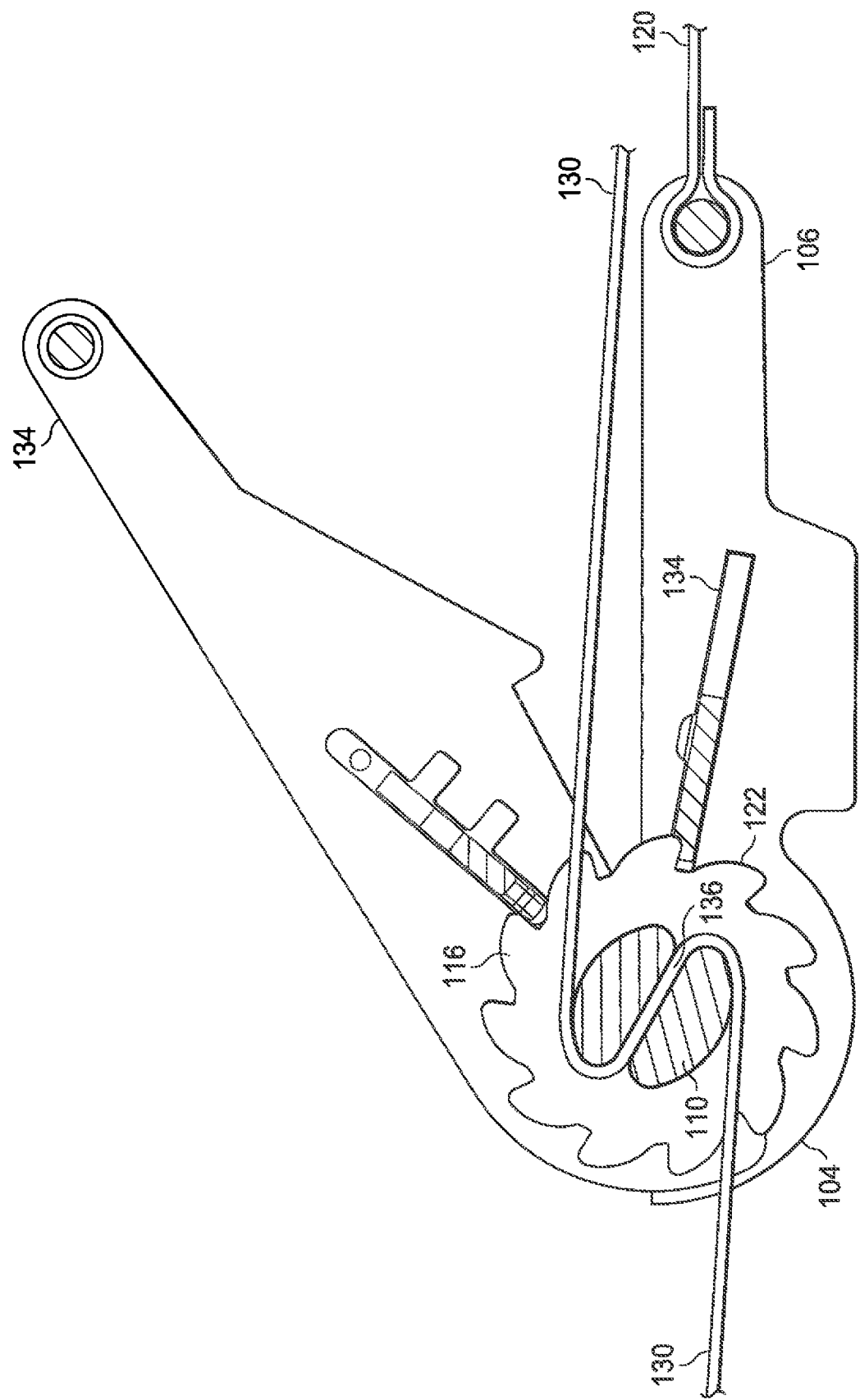
FIG. 2 is a partial cross-sectional view of the tie down ratchet and strap of FIG. 1.

FIG. 2 is a partial cross-sectional view of the tie down ratchet and strap of FIG. 1. As illustrated a pair of ratchet wheels 116 are mounted on ratchet shaft 110 adjacent opposing ends of the shaft. Each of ratchet wheels 116 includes a plurality of teeth 122 formed around the perimeter of the ratchet wheel. A wind-up strap 130 is passed through a slot 136 in ratchet shaft 110. A free end of wind-up strap 130 may be provided with a D-ring 132, O-ring or other suitable connector for connecting the wind-up strap to a second anchor point (FIG. 1). Wind-up strap 130 is tensioned by moving or stroking ratchet handle 114 in the direction designated by arrow A. Pawl 118 engages teeth 122 of ratchet wheels 116, rotating ratchet shaft 110 and winding wind-up strap 130 around ratchet shaft 110 between ratchet wheels 116 as ratchet handle 114 is moved in the direction designated by arrow A. Spring loaded locking bar 134 engages teeth 122 of ratchet wheels 116 as ratchet shaft 110 rotates, holding the ratchet shaft and wind-up strap 130 in position after ratchet handle 114 has been moved through the desired or maximum stroke and pawl 118 disengaged from the teeth. Ratchet handle 114 is then moved in the direction indicated by arrow B to reset pawl 118 for another stroke.

To utilize ratchet assembly 100, wind-up strap 130 is fed through slot 136 in ratchet shaft 110 as illustrated in FIG. 1. To adjust the length of wind-up strap 130 used to secure an item, a portion of the wind-up strap may be pulled though slot 136 prior to deploying ratchet assembly 110. Ratchet handle 114 is then stroked to wind wind-up strap 130 over ratchet shaft 110 sufficiently to hold the wind-up strap in place on the shaft. Anchor strap 120 is then connected to a first anchor point with hook 124. Wind-up strap 130 is positioned over, around or through the item to be secured and D-ring 132 is used to connect the wind-up strap to a second anchor point. For example, wind-up strap 130 may be stretched over a load of pipe on a flat bed trailer with hook 24 and D-ring 132 attached to tie downs on either side of the trailer. Ratchet handle 114 is then engaged and moved in the direction indicated by arrow A of FIG. 2 to wrap wind-up strap 130 around ratchet shaft, shortening the length of the wind-up strap to tension the wind-up strap and anchor strap 120 as described above.

To release wind-up strap 130 from tension, spring loaded locking bar 134 is retracted and disengaged from teeth 122 of ratchet wheel 116 as tension is maintained on the wind-up strap with ratchet handle 114. Ratchet handle 114 is then moved in the direction indicated by arrow B to release wind-up strap 130 from tension. After wind-up strap 130 is released from tension and locking bar 134 retracted, spring loaded pawl 118 may be retracted from ratchet teeth 122 allowing ratchet shaft 110 to rotate in the direction indicated by arrow B to unwind the wind-up strap from ratchet shaft 110.

Figure 3:
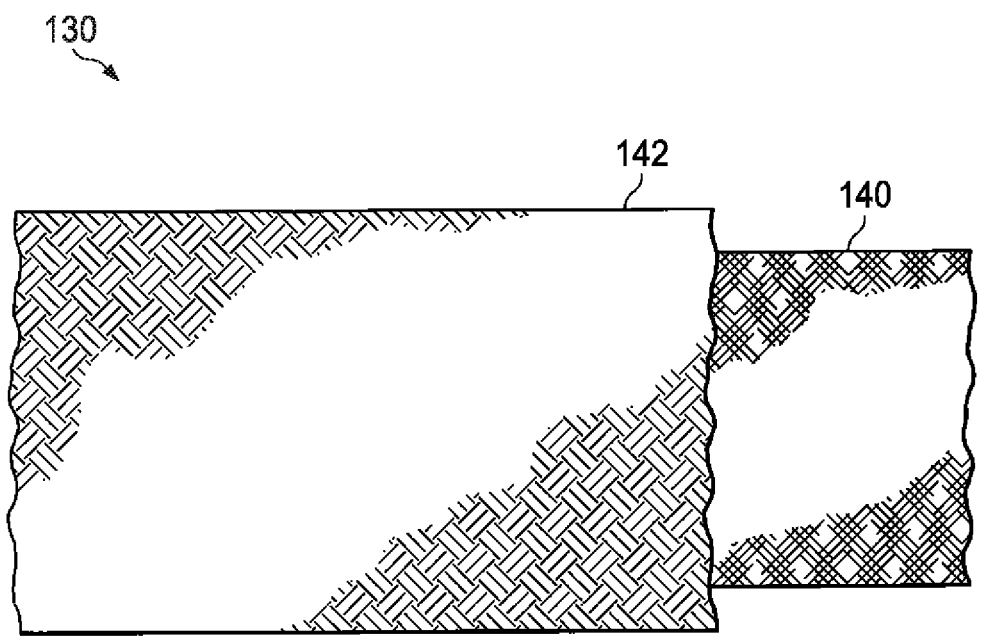
FIG. 3 is a partial perspective view of a wind-up strap suitable for use with tie down ratchet and strap of FIG. 1.

FIG. 3 is a partial perspective view of a wind-up strap 130 suitable for use with ratchet assembly 100. Wind-up strap 130 includes a flat, non-metallic interior fabric strap 140 and a braided metal outer cover 142. Interior fabric strap 140 may be formed from a polyester, nylon, polypropylene or other suitable material. In most applications, polyester strapping will be used due to its strength and resistance to stretching. As illustrated, wind-up strap 130 has a generally flat cross section that allows the strap to pass though slot 136 in ratchet shaft 110.

Figure 4:
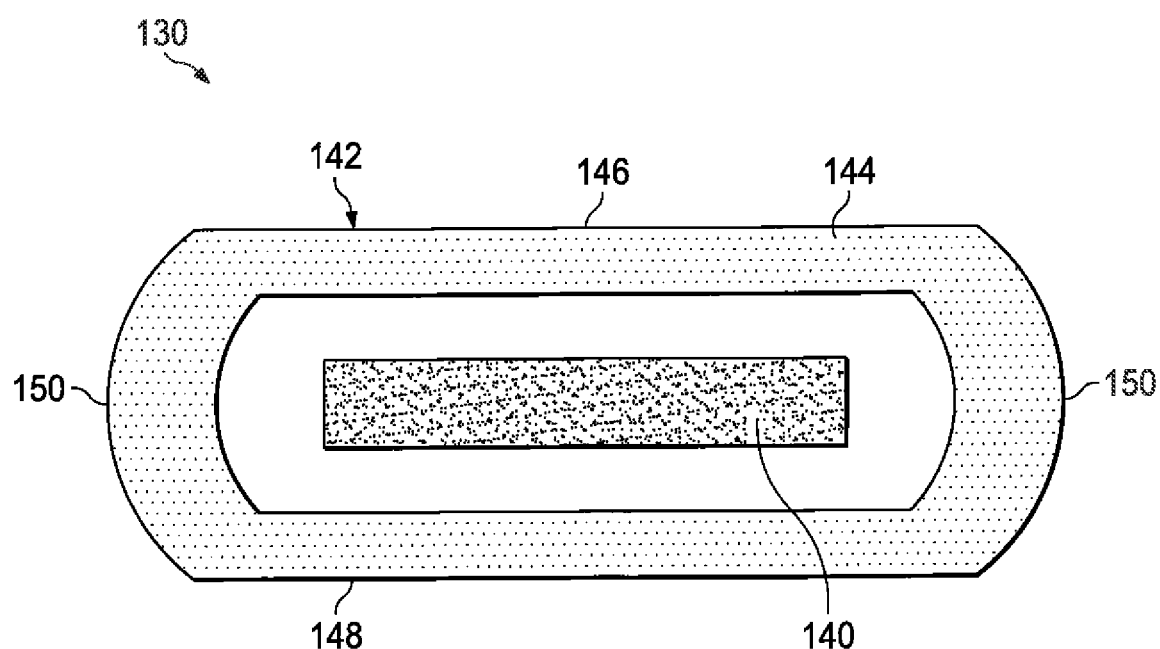
FIG. 4 is a cross-sectional view of the wind-up strap of FIG. 3.

FIG. 4 is a cross-sectional view of the wind-up strap of FIG. 3. As illustrated, fabric strap 140 is positioned in a braided metal outer cover 142 that extends continuously over substantially the entire length of wind-up strap 130. Braided metal outer cover 142 may be formed with stainless steel, aluminum, copper, and/or other suitable ductile wires 144. In one embodiment, wires 114 are 304 stainless steel and have a diameter from about 0.25 to about 0.4 mm. In different embodiments, wires may have a metal core with a coating, for example a steel, aluminum or copper core coated with tin. Braided metal outer cover 142 may be formed by braiding wires 144 or bundles of wire into a tubular form. In different embodiments, braided metal outer cover 142 may be formed with metal wires 114 only, with no non-metallic components included in braided metal outer cover 142.

In other embodiments, wires 114 may have a protective coating such as a polypropylene, polyethylene or other synthetic polymer to prevent corrosion and reduce abrasion. Wires 144 may have a diameter of less than 1.0 mm, from about 0.1 mm to about 0.5 mm. Wires 144 may be formed from a ductile metal or metal alloy such as stainless steel, aluminum or copper to minimize kinking or breakage. As illustrated, braided outer cover 142 has a generally rectangular configuration with a top wall 146, a bottom wall 148 and side walls 150. Fabric strap 140 is positioned between and extends substantially parallel to top and bottom walls 148 between side walls 150.

Figure 5:
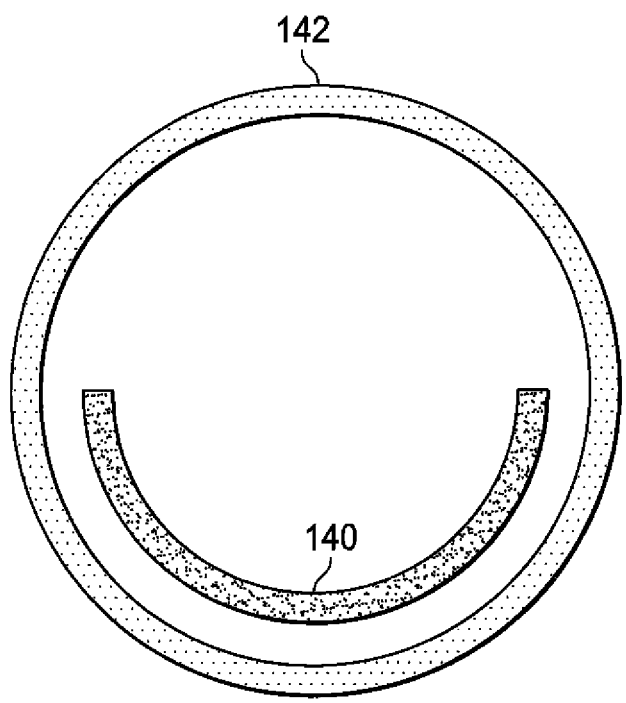
FIG. 5 is a cross-sectional view of the wind-up strap of FIG. 3 with the braided metal cover in tubular form prior to being formed into a generally rectangular configuration.
Figure 6:
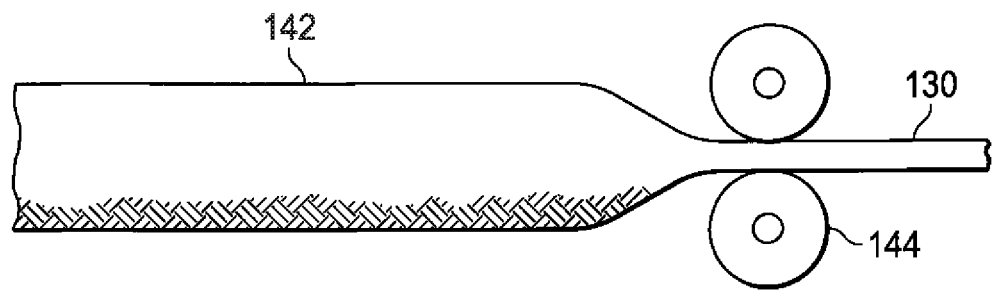
FIG. 6 illustrates the wind-up strap of FIG. 5 as it is passed through rollers to form the tubular cover around the fabric strap.

FIGS. 5 and 6 depict one method of making wind-up strap 130. FIG. 5 is a cross-sectional view of braided metal outer cover 142 and fabric strap 140 during assembly. As illustrated, fabric strap 140 has been drawn though and positioned in braided metal outer cover 142. FIG. 6 is a partial side view illustrating braided metal outer cover 142 with fabric strap 140 being drawn though rollers 152 to compress and flatten the braided metal outer cover over the fabric strap to form wind up strap 130.

Braided metal outer cover 142 of wind up strap 130 protects fabric strap 140 from mechanical abrasion and from UV degradation. Braided metal outer cover 142 further enhances the strength of fabric strap 140. In use, fabric strap 140 prevents braided metal outer cover 142 from collapsing, kinking and breaking wires when the strap is wrapped over, through or around an item to be secured.

It will be appreciated by those skilled in the art having the benefit of this disclosure that this tie down ratchet and strap provides a means of securing items to be transported such as items carried in a truck bed or on a flat bed trailer. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A tie down ratchet and strap comprising:
   a ratchet assembly including:
      a ratchet body having first and second ends;
      a ratchet shaft rotatably mounted in the ratchet body adjacent the first end of the ratchet body, the ratchet shaft having a slot for receiving a wind-up strap therethough;
      a pair of ratchet wheels mounted on the ratchet shaft adjacent opposing ends of the ratchet shaft, the pair of ratchet wheels including a plurality of teeth around a perimeter of each one of the pair of ratchet wheels;
      a ratchet handle with a spring-loaded pawl, the spring-loaded pawl engaging the teeth of the pair of ratchet wheels to rotate the ratchet shaft upon movement of the ratchet handle in a first direction;
      an anchor strap affixed to ratchet body adjacent the second end of the ratchet body, the anchor strap including a connector for connecting the anchor strap to first anchor point for securing the ratchet assembly to a first anchor point; and
   a wind-up strap including a non-metallic interior fabric strap with a braided metal outer cover enclosing, and extending continuously over a length of, the non-metallic interior fabric strap.

2. The tie down ratchet and strap of claim 1, wherein the wind-up strap further comprises a connector utilized to secure the ratchet assembly to a second anchor point.

3. The tie down ratchet and strap of claim 1, wherein the braided metal outer cover has a generally rectangular configuration with top and bottom walls, and wherein the non-metallic interior fabric strap extends between and parallel to the top and bottom walls.

4. The tie down ratchet and strap of claim 1, wherein the braided metal outer cover is formed from stainless steel, aluminum or copper wires.

5. The tie down ratchet and strap of claim 1, wherein the braided metal outer cover is formed from stainless steel, aluminum, or copper wires encased in a second metal coating.

6. The tie down ratchet and strap of claim 1, wherein the braided metal outer cover is formed from stainless steel, aluminum or copper wires having a polymer coating.

7. The tie down ratchet and strap of claim 1, wherein the non-metallic interior fabric strap is formed from a polyethylene, polypropylene or polyester.

8. A tie down ratchet and strap comprising:
a ratchet assembly including a ratchet body, a ratchet shaft rotatably mounted in the ratchet body, the ratchet having a slot for receiving a wind-up strap therethough, a pair of ratchet wheels mounted on the ratchet shaft at opposing ends of the ratchet shaft, a ratchet handle having a pawl engaging the pair of ratchet wheels to rotate the ratchet shaft upon movement of the ratchet handle in a first direction, a locking bar securing the pair of ratchet wheels and ratchet shaft in position when the pawl is disengaged from the pair of ratchet wheels;
a polyester anchor strap affixed to ratchet body, the anchor strap including a connector attaching the anchor strap to first anchor point and securing the ratchet assembly to a first anchor point; and
a wind-up strap including a non-metallic interior fabric strap with a braided metal outer cover enclosing, and extending continuously over a length of, the non-metallic interior fabric strap, the braided metal outer cover formed from wires having a diameter from about 0.1 mm to about 0.5 mm.

9. The tie down ratchet and strap of claim 8, wherein the braided metal outer cover has a generally rectangular configuration with top and bottom walls, and wherein the non-metallic interior fabric strap extends between and parallel to the top and bottom walls.

10. The tie down ratchet and strap of claim 8, wherein the braided metal outer cover is formed from stainless steel, aluminum or copper wires.

11. The tie down ratchet and strap of claim 8, wherein the braided metal outer cover is formed from stainless steel, aluminum, or copper wires encased in a second metal coating.

12. The tie down ratchet and strap of claim 8, wherein the braided metal outer cover is formed from stainless steel, aluminum or copper wires having a polymer coating.

13. The tie down ratchet and strap of claim 8, wherein the non-metallic interior fabric strap is formed from a polyethylene, polypropylene or polyester.

* * * * *